(12) United States Patent
Jeong

(10) Patent No.: US 6,348,928 B1
(45) Date of Patent: Feb. 19, 2002

(54) APPARATUS FOR AUTOMATICALLY ROTATING VISUAL DISPLAY UNIT AND METHOD THEREFOR

(75) Inventor: Seok Hwa Jeong, Kumi (KR)

(73) Assignee: LG Electronics Inc.

( * ) Notice: Subject to any disclaimer, the term of this patent is extended or adjusted under 35 U.S.C. 154(b) by 0 days.

(21) Appl. No.: 09/427,323

(22) Filed: Oct. 26, 1999

(30) Foreign Application Priority Data

Nov. 13, 1998 (KR) .............................................. 98/48630

(51) Int. Cl.$^7$ ................................................. G09G 5/34
(52) U.S. Cl. ........................................ 345/649; 345/650
(58) Field of Search ................................. 345/649, 650, 345/651, 652, 659, 126

(56) References Cited

U.S. PATENT DOCUMENTS 5,250,888 A * 10/1993 Yu .............................. 318/640

* cited by examiner

Primary Examiner—Matthew Luu
(74) Attorney, Agent, or Firm—Ostrolenk, Faber, Gerb & Soffen, LLP

(57) ABSTRACT

An apparatus for automatically rotating a visual display unit which is capable of rotating a display screen of the visual display unit manually or automatically according to a viewer's desire, and of automatically rotating the display screen rightward and leftward according to a body temperature of the viewer after the body temperature is sensed by using an infrared light radiated from the front surface of the visual display unit, so that the viewer can watch television comfortably and easefully, and its method. The apparatus for automatically rotating a visual display unit including: a body temperature sensing unit for sensing a body temperature of a viewer positioned in front of a display screen; a discrimination unit for receiving an output signal from the body temperature sensing unit and discriminating a range (angle) in which the body temperature is sensed; a range value setting unit for compensating the range in which the body temperature is sensed; an arithmetic operation unit for computing a central axis of rotation of the display screen; and a driving unit for rotating the display screen of the visual display unit according to the result of the computation.

24 Claims, 4 Drawing Sheets

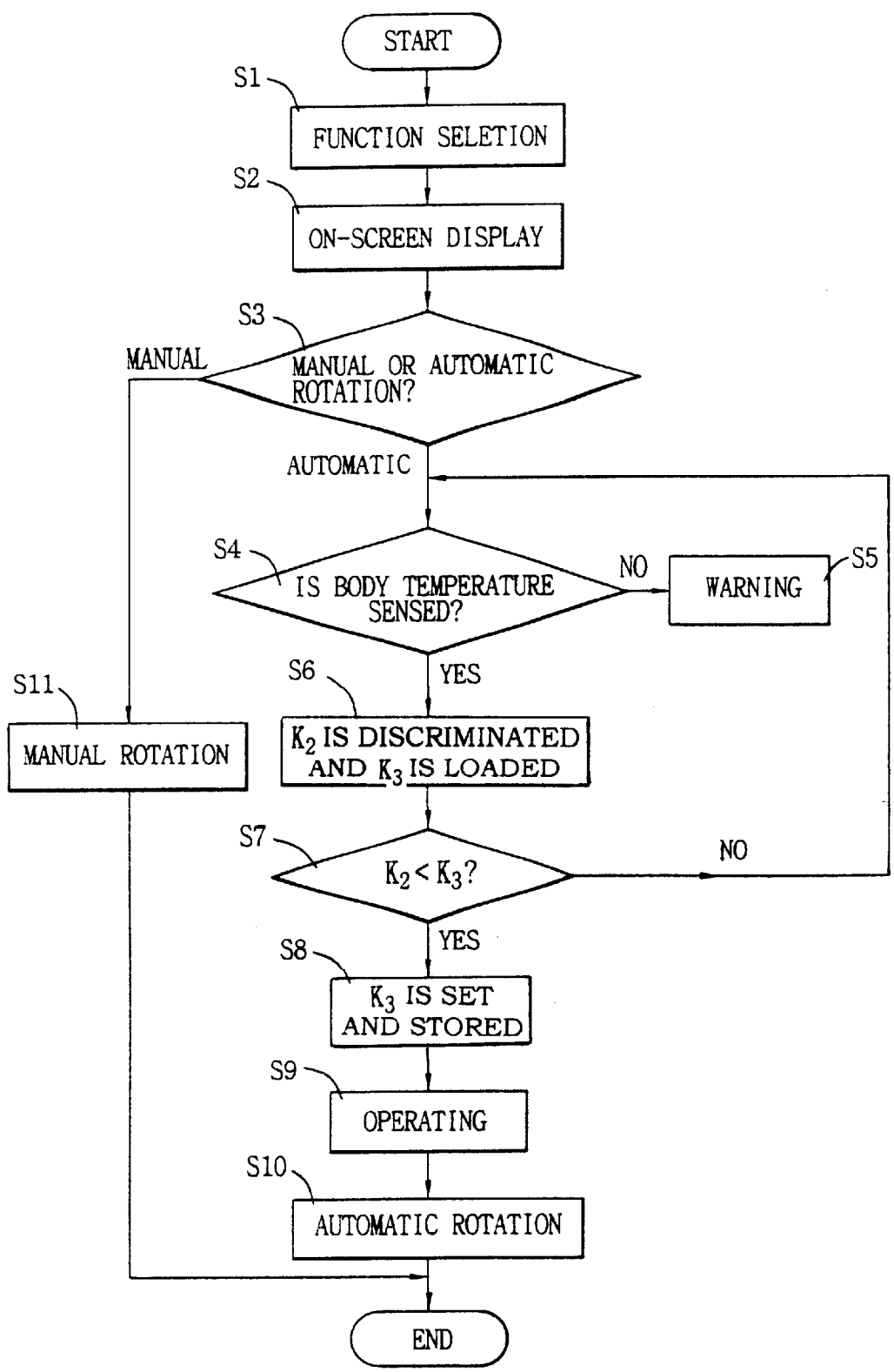

APPARATUS FOR AUTOMATICALLY ROTATING VISUAL DISPLAY UNIT AND METHOD THEREFOR

BACKGROUND OF THE INVENTION

1. Field of the Invention

The present invention relates to an apparatus for automatically rotating a visual display unit such as a monitor of a computer or a TV stand, and more particularly, to an apparatus for automatically rotating a visual display unit which is capable of automatically rotating a display screen of the visual display unit according to various positions of a user or a viewer as it senses a body temperature of the user or the viewer positioned in front of the visual display unit, and to its method.

2. Description of the Background Art

A conventional technique for rotating a display screen of the visual display unit such as a monitor of a computer or a TV stand will now be described with reference to FIG. 1.

FIG. 1 shows rotating state of a display screen of a visual display unit in accordance with a conventional art.

Conventionally, a display screen 2 of the visual display unit is rotated manually or by using a remote-controller by a viewer.

Namely, as shown in FIG. 1, in order to view an image through the display screen 2 of the visual display unit 1, the viewer should rotate the display screen 2 of the visual display unit 1 rightward or leftward by using his hands directly or by using a remote-controller so that it can direct to the viewer for viewing.

However, as to such method, since the viewing angle for the viewer is made by a manual manipulation of the viewer, causing inconvenience in use for the viewer.

SUMMARY OF THE INVENTION

Therefore, an object of the present invention is to provide an apparatus for automatically rotating a visual display unit which is capable of rotating a display screen of the visual display unit manually or automatically according to a viewer's desire, and of automatically rotating the display screen rightward and leftward according to a body temperature of the viewer after the body temperature is sensed by using an infrared light radiated from the front surface of the visual display unit, so that the viewer can watch television comfortably and easefully, and its method.

To achieve these and other advantages and in accordance with the purposed of the present invention, as embodied and broadly described herein, there is provided an apparatus for automatically rotating a visual display unit including: a body temperature sensing unit for sensing a body temperature of a viewer positioned in front of a display screen; a discrimination unit for receiving an output signal from the body temperature sensing unit and discriminating a range (angle) in which the body temperature is sensed; a range value setting unit for compensating the range in which the body temperature is sensed; an arithmetic operation unit for computing a central axis of rotation of the display screen; and a driving unit for rotating the display screen of the visual display unit according to the result of the computation.

There is also provided a method for automatically rotating a visual display unit including the steps of: setting an automatic rotation control mode or a manual rotation control mode of a screen display of a visual display unit; sensing a body temperature of a viewer positioned in front of the display screen of the visual display unit according to the mode as set; discriminating a range (angle) in which the body temperature is sensed; performing an arithmetic operation so as for a central axis of the display screen of the visual display unit to be placed at the center of the discriminated angle; and rotating the display screen of the visual display unit according to the result of the arithmetic operation.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a flow chart of a method for automatically rotating the visual display unit in accordance with the present invention

DETAILED DESCRIPTION OF THE PREFERRED EMBODIMENTS

Reference will now be made in detail to the preferred embodiments of the present invention, examples of which are illustrated in the accompanying drawings.

Figure 1:
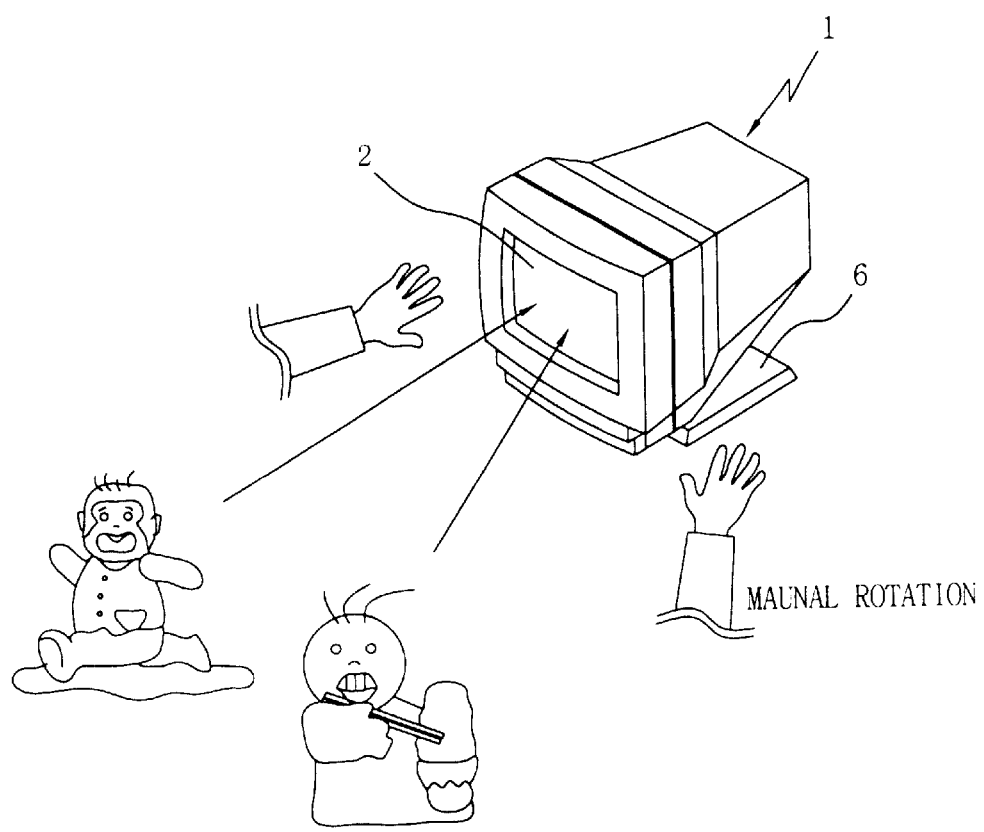
FIG. 1 shows a rotating state of a visual display unit and its method in accordance with a conventional art.

A construction of the apparatus for automatically rotating a visual display unit and its method will now be described with reference to FIGS. 1, 2 and 4.

Figure 2:
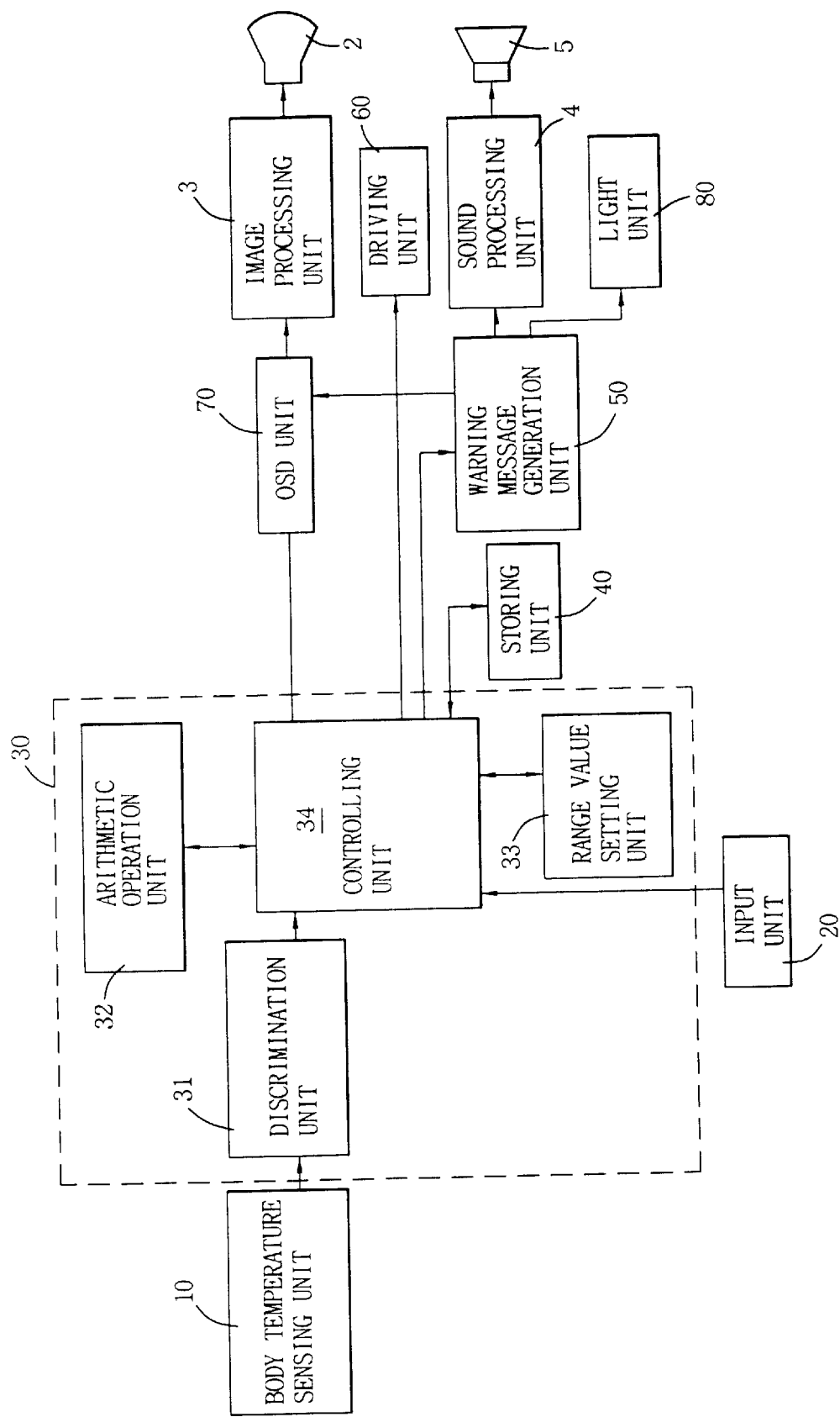
FIG. 2 is a schematic diagram of an apparatus for automatically rotating a visual display unit in accordance with the present invention.

As shown in FIG. 2, the apparatus for automatically rotating a visual display unit in accordance with the present invention includes a body temperature sensing unit 10 for sensing a body temperature of a viewer positioned in front of a visual display unit 1; an input unit 20 for receiving a signal for controlling general functions (i.e., control of volume, control of brightness, or selection of channel, etc.) of the visual display unit 1 and a signal required for automatic rotation or manual rotation of a display screen 2; a microprocessor 30 for outputting a control signal for automatically rotating the display screen of the visual display unit upon receipt of the output signal from the body temperature sensing unit 10 and the output signal from the input unit 20 and; a driving unit 60 for rotating the display screen 2 upon receipt of the control signal from the microprocessor 30; a storing unit 40 for storing the output data of the microprocessor 30; a warning message generation unit 50 for generating a warning message that there is no body temperature sensed according to the control of the microprocessor 30 if no body temperature was sensed by the body temperature sensing unit 10; a light unit 80 and a sound processing unit 4 for informing a viewer of the warning message as a character, a light lamp or a sound according to the output signal of the warning message generation unit 50; an on-screen display unit 70 for displaying an on-screen display menu for showing a pre-set content or changing a pre-set content, on the display screen 2.

The microprocessor 30 includes a discrimination unit 31 for discriminating a range (angle) in which the body temperature is sensed, upon receipt of the output signal from the body temperature sensing unit 10; an arithmetic operation unit 32 for performing arithmetic operation to search the center of an angle in which the body temperature was sensed by the discrimination unit 31; a range value setting unit 33 for setting a body temperature sensing compensation range value (K3); and a controlling unit 34 for outputting a control signal for controlling an automatic rotation of the visual display unit upon receipt of the output signal from the input unit 20.

The storing unit 40 includes an EEPROM (electrical erasable programmable read only memory), and the input unit 20 includes at least one of a control panel integrally provided at the visual display unit 1, a key board of a personal computer or a remote-controller.

FIG. 4 is a flow chart of a method for automatically rotating a visual display unit in accordance with the present invention.

The method for automatically rotating the visual display unit in accordance with the present invention includes the steps of: selecting a function for controlling of a rotation of a visual display unit 1 according to a signal outputted from an input unit 20 in a step S1; displaying a function selection menu as an on-screen display through a display screen in a step S2; judging whether the rotation of the display screen 2 was selected as an automatic operation or a manual operation according to the function selection menu displayed as the on-screen display in a step S3; rotating manually the display screen 2 by the input unit 20 if the rotation of the display screen 2 was selected as a manual operation according to the result of judging in the step S3; sensing a body temperature of a viewer positioned in front of the display screen 2 if the rotation of display screen 2 is selected as an automatic operation; generating a warning message if a body temperature of the viewer is not sensed in a step S5; discriminating a body temperature sensing range value K2 and loading the value K3 stored in the storing unit 40; if the body temperature of the viewer is sensed in a step S6; comparing the discriminated body temperature sensing range value K2 with a body temperature sensing compensation range value K3 in a step S7; repeating the steps S4–S6 in case that the value K2 is smaller than the value K3 upon the comparison in the step S7, and setting range value K3 as K3=K2+α if the range value K2 is larger than the range value K3 in a step S8; performing an arithmetic operation to search the center of the range value K2 discriminated in the step S6 or the center of the range value K3 set in the step S8; and automatically rotating the display screen 2 toward the center of the range value K2 or K3 according to a result of the arithmetic operation.

The warning message in the step S5 is outputted through the sound processing unit 4, the light unit 80 or the on-screen display unit 70 of FIG. 2.

The step S2 may include a sub-step in which the on-screen display is released if a predetermined time lapses after the on-screen display is displayed or a storing button of the input unit is pressed down.

Figure 3:
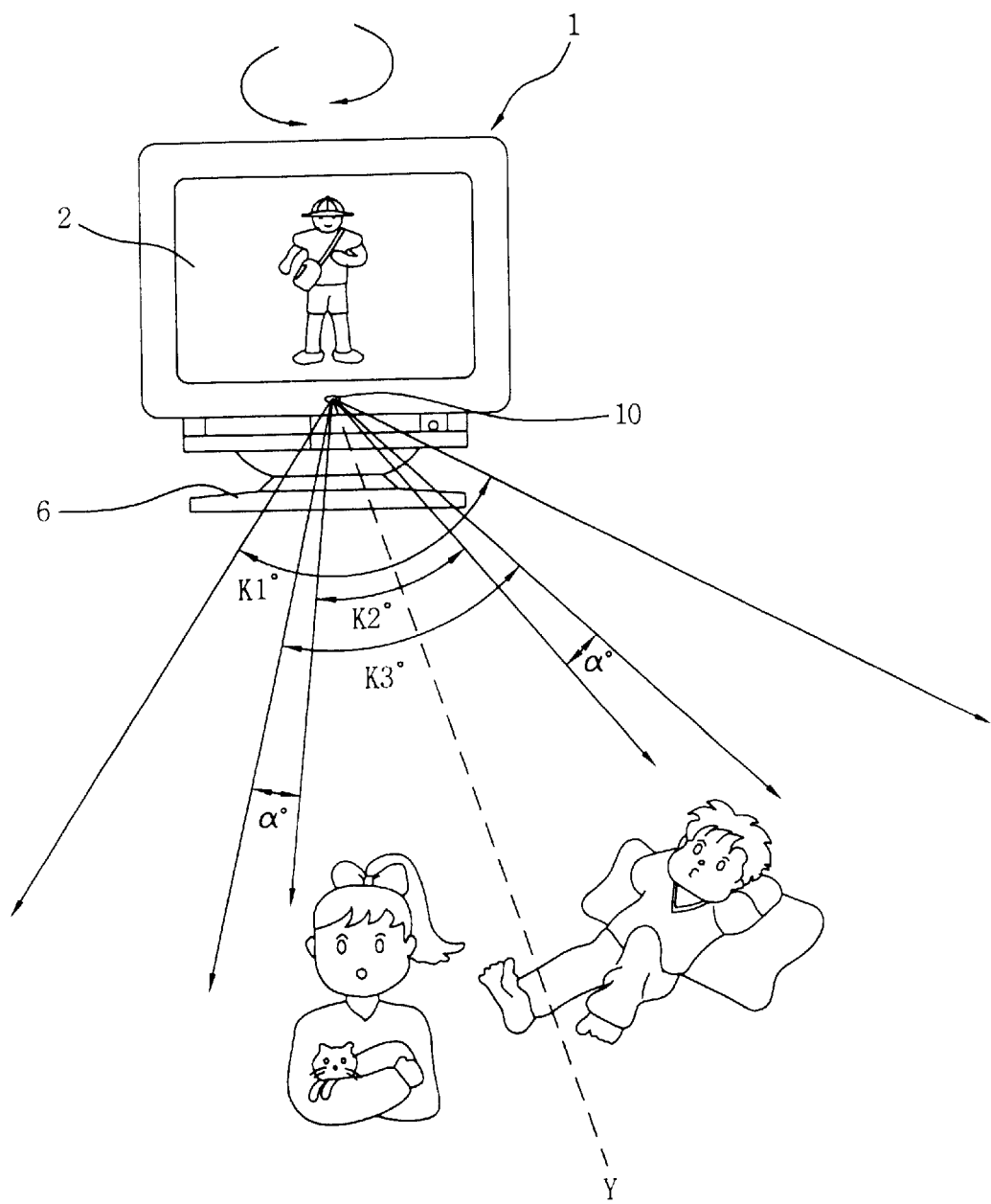
FIG. 3 shows states of use of the apparatus for automatically rotating the visual display unit in accordance with the present invention.

The operation of the apparatus for automatically rotating a visual display unit in accordance with the present invention constructed as described above will now be explained with reference to FIGS. 2 through 4.

In case that the display screen 2 is desired to be rotated automatically rightward or leftward centering the viewer while the visual display unit 1 is being turned on, the viewer selects a function through the input unit 20, and then, a corresponding signal is inputted to the microprocessor 30.

Upon receipt of the function selection signal, the microprocessor 30 controls the on-screen display unit 70 so that a function selection menu for automatic rotation control of the display screen 2 can be displayed on the display screen as on-screen display.

At this time, watching the on-screen display displayed on the display screen 2, when the viewer inputs a signal for either an automatic rotation or a manual rotation of the display screen 2 through the input unit 20, the microprocessor 30 selects either an automatic rotation mode or a manual rotation mode for a rotation of the display screen 2 according to the input signal.

Upon completion of the selection of either the automatic rotation mode or the manual rotation mode, when the storing button of the input unit 20 is pressed down or a predetermined time lapses, the microprocessor 30 controls the on-screen display unit 70, so that the on-screen display displayed on the display screen 2 is released.

In case that the automatic rotation mode or the manual rotation mode was selected to be stored in the storing unit 40, the visual display unit is operated according to the stored mode when it is turned on later.

In case that that the visual display unit is set by the manual rotation mode, the display screen of the visual display unit is rotated according to an input signal of the input unit 20, which is the same as that in the conventional art.

The operation of the display screen 2 as is set by an automatic rotation mode will now be described.

The body temperature sensing unit 10 installed at the front surface of the visual display unit 1 radiates an infrared light to sense a body temperature of the viewer positioned in front of the visual display unit 1 and inputs it to the microprocessor 30. Then, the discrimination unit 31 of the microprocessor 30 discriminates a range (angle) in which the body temperature of the viewer is sensed.

In other words, when the body temperature sensing unit 10 senses a temperature $36\pm\beta C°$ ($\beta$ is a tolerance in body temperature discrimination) in front of the display screen 2, it judges that there is a viewer in front of the display screen and the discrimination unit 31 discriminates an angle in which the body temperature of the viewer is sensed.

In case that there are several viewers in front of the display screen 2, the discrimination unit 31 senses the positions of both viewers who are in the outmost positions of right and left sides, making maximum angle therebetween, to discriminate the range value K2, that is, the angle in which the body temperature is sensed.

Upon receipt of the range value K2 discriminated by the discrimination unit 31, the range value setting unit 33 sets the range value K3, that is, the body temperature sensing compensation range value for compensating the range value K2 so that the display screen are not rotated over a slight and insignificant movement of the viewer.

The body temperature sensing compensation range value K3 can be represented by K2+α, of which α indicates a compensation range value.

The range value K3 is set by the range value setting unit 33 of the microprocessor 30, as performed in the step S8 of FIG. 4, and stored in the storing unit 40.

Accordingly, the range of the infrared light radiated from the body temperature sensing unit 10 is divided into the range K1, the maximum radiation range of the infrared light as is fixed in a hardware system, the range K2 in which the body temperature of the viewer discriminated by the discrimination unit 31 is sensed, and the range K3 of the body temperature sensing compensation range.

The arithmetic operation unit 32 receives the range value K2, that is, the result of the discrimination done by the discrimination unit 31 and the range value K3, that is, the body temperature sensing compensation range value set by the range value setting unit 33, through the controlling unit 34, and computes a central axis of rotation required for rotating the display screen.

The central axis of rotation becomes the center of the range value K2 or the range value K3, that is, the position of K2°×½ or K3°×½, which is performed in the step S9 of FIG. 4.

The process for rotating the display screen according to the movement of the viewer will now be described.

The body temperature sensing unit 10 keeps on radiating the infrared light, and the discrimination unit 31 discriminates the range value K2, the body temperature sensing range, by using the radiated infrared light.

As shown in the step S7 of FIG. 4, the controlling unit 34 compares the range value K2 as discriminated and the range value K3 stored in the storing unit 40 and applies the comparison result to the arithmetic operation unit 32. Then, the arithmetic operation unit 32 computes the rotation range of the display screen 2.

Therefore, as the viewer moves, the range value K2 is accordingly changed, and the changed K2 range value is compared with the range value K3, that is, the body temperature sensing compensation range value prior to the viewer's movement.

Upon such comparison, in case that the body temperature sensing range value K2 is smaller than the body temperature sensing compensation range value K3 (K2<K3) and the viewer is positioned beyond the range value K3, the steps S4–S6 are repeatedly performed to sense the body temperature of the viewer.

Meanwhile, in case that the range value K2 is larger than the range value K3 (K2>K3), the step S8 is performed in which the range value K3 is reset as K3=K2+α in consideration of α, that is, the compensation range (angle) set in the range value setting unit 33, and the arithmetic operation unit 32 computes the central axis of rotation for rotating the display screen (the step S9).

On the basis of the result of the operation of the arithmetic operation unit 32, the controller 34 outputs a control signal to control the driving unit 60, and the driving unit 60 rotates the display screen 2 upon receipt of the control signal.

In this respect, even though the viewer positioned in front of the display screen 2 moves within the body temperature sensing compensation range value K3, the display screen 2 is not rotated.

The tolerance β of the temperature sensed by the body temperature sensing unit 10 and the compensation range ox in the body temperature sensing compensation range value K3 may be set in the step S2 of FIG. 4.

The case that the body temperature of the viewer is not sensed in front of the display screen 2 in the step S4 of FIG. 4 will now be described. In this case, since the viewer is positioned beyond the range value K1, the maximum radiation range of the infrared light, the body temperature of the viewer can not be sensed, and thus, a warning message is generated. This warning message is outputted through the on-screen display unit 70, the sound processing unit 4 or the light unit 80 under the control of the microprocessor 30.

The on-screen display unit 70 displays a character warning message informing that the body temperature of the viewer is not sensed, on the display screen 2 through the image processing unit 3, so that the viewer can notice that the display screen 2 is not rotated automatically. And, the light lamp of the light unit 80 is operated to inform that the body temperature of the viewer is not sensed so that the viewer can notice visually that the display screen 2 was not rotated automatically. Also, the sound processing unit 4 outputs externally a sound warning message informing that the body temperature of the viewer is not sensed, through a speaker.

As so far described, according to the apparatus for automatically rotating the visual display unit and its method of the present invention, the display screen 2 is rotated manually according to the user's desire, and the body temperature of the viewer is sensed by the radiation of the infrared light, based on which the display screen 2 of the visual display unit 1 is automatically rotated in the range (angle) where the viewer can watch the image of the display screen comfortably and easefully.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. An apparatus for automatically rotating a visual display unit comprising:

a body temperature sensing unit for sensing a body temperature of a viewer positioned in front of a display screen, a discrimination unit for discriminating a range (angle) in which the body temperature is sensed;

a range value setting unit for compensating the body temperature sensing range discriminated by the discrimination unit;

a controlling unit for performing an arithmetic operation so as for the central axis of a display screen of the visual display unit to be placed at the center of a body temperature sensing angle, and outputting a control signal for controlling an automatic rotation of the visual display unit, upon receipt of the output signal from the discrimination unit; and a driving unit for rotating the display screen of the visual display unit upon receipt of the output signal from the controlling unit.

2. The apparatus according to claim 1, wherein the body temperature of the viewer is sensed by the body temperature sensing unit installed at the front surface of the visual display unit, using an infrared light, and the sensed body temperature of the viewer is in the range of 36° C.±β° C. (β is a tolerance for sensing the body temperature).

3. The apparatus according to claim 1, wherein a warning message is generated by a character, a light lamp or a sound in case that no body temperature of a viewer is sensed by the body temperature sensing unit.

4. The apparatus according to claim 1, wherein the body temperature sensing range (angle) is divided into a maximum radiation range (K1) of the infrared light, a body temperature sensing range (K2) in which the body temperature of the viewer is sensed, and a body temperature sensing compensation range (K3) for compensating the range K2, and the display screen is not rotated even though the viewer moves in the range of K3.

5. The apparatus according to claim 4, wherein K3 is K2+α (α=compensation range), and the central axis of rotation of the display screen computed by the controlling unit is based on the center of the range value K2, that is, the position of K2×½, or the center of the range value K3, that is, the position of K3×½.

6. The apparatus according to claim 4, wherein in case that there are several viewers positioned in front of the display screen, the body temperature sensing range value (K2) is determined on the basis of the body temperature of both viewers who are in the outmost positions of right and left sides, making maximum angle therebetween.

7. The apparatus according to claim 4, wherein if K2 is larger than K3, the range value K3 is reset and stored, and the central axis of rotation of the display screen is moved to be changed so that the display screen is automatically rotated accordingly.

8. An apparatus for automatically rotating a visual display unit comprising:

a body temperature sensing unit for sensing a body temperature of a viewer positioned in front of a display screen of the visual display unit;

an input unit for inputting a signal for controlling general functions of the visual display unit and outputting a signal for setting an automatic rotation mode or a manual rotation mode of the display screen and a signal required for sensing a body temperature;

a microprocessor for setting an automatic rotation or a manual rotation of the display screen according to the input signal from the input unit, discriminating a sensing angle of the body temperature sensed by the body temperature sensing unit, and computing the central axis of rotation of the display screen to thereby control the automatic rotation of the display screen;

a storing unit for storing the output signal from the microprocessor;

a driving unit for rotating the display screen according to the output signal from the microprocessor; and an on-screen display unit for displaying a function selection menu for the automatic rotation mode or the manual rotation mode of the display screen, on the display screen.

9. The apparatus according to claim 8, wherein the input unit includes at least one of a control panel integrally provided at the visual display unit, a key board of a personal computer, or a remote-controller.

10. The apparatus according to claim 8, wherein the microprocessor includes:

a discrimination unit for discriminating a body temperature sensing range (angle) of a viewer sensed by the body temperature sensing unit;

a range value setting unit for compensating the body temperature sensing range discriminated by the discrimination unit;

an arithmetic operation unit for computing a central axis of rotation of the display screen on the basis of the body temperature sensing range of the viewer discriminated by the discrimination unit; and a controlling unit for outputting a control signal for controlling the automatic rotation of the display screen upon receipt of the output signal from the arithmetic operation unit.

11. The apparatus according to claim 8, wherein the body temperature of the viewer is sensed by the body temperature sensing unit installed at the front surface of the visual display unit, using an infra red light, and the sensed body temperature of the viewer is in the range of 36° C.±β° C. (β is a tolerance for sensing the body temperature).

12. The apparatus according to claim 8, wherein the body temperature sensing range (angle) is divided into a maximum radiation range (K1) of the infrared light, a body temperature sensing range (K2) in which the body temperature of the viewer is sensed, and a body temperature sensing compensation range (K3) for compensating the range K2, and the display screen is not rotated even though the viewer moves in the range of K3.

13. The apparatus according to claim 8, wherein when no body temperature is sensed by the body temperature sensing unit, a warning message is generated by a character, a light lamp or a sound.

14. The apparatus according to claim 12, wherein K3 is K2+α (α=compensation range), and the central axis of rotation of the display screen computed by the microprocessor is based on the center of the range value K2, that is, the position of K2×½, or the center of the range value K3, that is, the position of K3×½.

15. The apparatus according to claim 12, wherein if K2 is larger than K3, the range value K3 is reset and stored, and the central axis of rotation of the display screen is moved to be changed so that the display screen is automatically rotated accordingly.

16. The apparatus according to claim 12, wherein in case that there are several viewers positioned in front of the display screen, the body temperature sensing range value (K2) is determined on the basis of the body temperature of both viewers who are in the outmost positions of right and left sides, making maximum angle therebetween.

17. A method for automatically rotating a visual display unit comprising the steps of:

setting an automatic control mode or a manual control mode of a display screen of the visual display unit;

sensing a body temperature of a viewer positioned in front of the display screen of the visual display unit when the automatic control mode is set;

discriminating a range (angle) in which the body temperature is sensed;

performing an arithmetic operation so as for a central axis of the display screen of the visual display unit to be placed at the center of the discriminated angle; and rotating the display screen of the visual display unit according to the result of the arithmetic operation.

18. The method according to claim 17, wherein the step for setting the rotation control mode includes a sub-step for displaying a function selection menu for controlling the rotation according to a signal outputted from an input unit, as an on-screen display and selecting a function according to the on-screen display.

19. The method according to claim 17, wherein the step for setting the rotation control mode includes a sub-step for releasing the on-screen display when the rotation control mode setting is completed or a predetermined time lapses.

20. The method according to claim 17, further includes a step for generating a warning message by a character, a light lamp or a sound when a body temperature of a viewer is not sensed in the step for sensing the body temperature of the viewer.

21. The method according to claim 17, wherein the range in the step for discriminating the range (angle) in which the body temperature is sensed is divided into a maximum radiation range (K1) of the infrared light, a body temperature sensing range (K2) in which the body temperature of the viewer is sensed, and a body temperature sensing compensation range (K3) for compensating the range K2, and the display screen is not rotated even though the viewer moves in the range of K3.

22. The method according to claim 21, wherein the body temperature sensing compensation range $K3=K2+\alpha$.

23. The method according to claim 21, wherein in the step for rotating the display screen, when the range value K2 (the body temperature sensing range) is larger than the range value K3 (the body temperature sensing compensation range), the range value K3 is reset and stored, and the central axis of rotation of the display screen is moved to be changed so that the display screen is automatically rotated accordingly.

24. The apparatus according to claim 21, wherein in case that there are several viewers positioned in front of the display screen, the body temperature sensing range value (K2) is determined on the basis of the body temperature of both viewers who are in the outmost positions of right and left sides, making maximum angle therebetween.

* * * * *